Aug. 20, 1968   A. R. BARRINGER ET AL   3,398,355
GROUNDWATER SURVEY METHOD AND APPARATUS
Filed Aug. 9, 1965   2 Sheets-Sheet 1

INVENTORS
ANTHONY RENÉ BARRINGER
JOSEPH F. WHITE
BY Rogers & Bereskin

United States Patent Office 3,398,355
Patented Aug. 20, 1968

3,398,355
GROUNDWATER SURVEY METHOD AND APPARATUS
Anthony Rene Barringer, Willowdale, Ontario, and Joseph F. White, Agincourt, Ontario, Canada, assignors to Barringer Research Limited, Rexdale, Ontario, Canada
Filed Aug. 9, 1965, Ser. No. 478,329
12 Claims. (Cl. 324—.5)

ABSTRACT OF THE DISCLOSURE

A method and apparatus are disclosed for detecting moisture in the earth from a station at or above the surface of the earth. Spaced, unidirectional magnetic field pulses are applied to the earth to produce nuclear precession in the moisture therein. Precessional signals are picked up in the intervals between the pulses. Analysis of the precession signals yields estimates of the quantity of moisture in said volume of earth and the nature of its environment.

---

This invention relates to a method and apparatus for detecting moisture in the earth and in particular to a novel method and apparatus for determining the ground water content of a given area and the nature of the surrounding environment of water in the earth from an aircraft or a land vehicle.

It has been proposed to detect ground water by placing a coil of relatively large diameter on the surface of the earth and energizing the coil with a short burst of alternating current of the Larmor frequency of protons in the ground water. The resulting alternating magnetic field penetrates into the earth and excites the protons into a higher energy level. The field is then abruptly extinguished and the protons precess freely at the Larmor frequency about the earth's magnetic field as they return to their original energy levels. The precession of the protons is coherent and results in a field which can be detected in the coil if a sufficient number of protons have been excited. The coil is periodically switched between transmitting and receiving conditions, for example two or three times per second.

The above method is tedious because the coil has to be laid out on the ground prior to each measurement and then picked up again before moving to another location. In addition, the measurements are confined to the surface of the earth.

It is now proposed to detect moisture in the earth from an airplane or a land vehicle. According to the invention, a transmitting coil is energized by a repetition of abruptly terminated periodic pulses, and the repetition frequency of the pulses is such that an alternating magnetic field of the proton Larmor frequency is induced into the earth. Precession signals are received during intervals between successive transmitted pulses. The amplitude and time constant of the precession signals respectively indicate the quantity of water in the earth and the nature of the water environment so that the invention can be used not only for locating supplies of ground water but also for determining the quality of an aquifer. Estimation of terrain trafficability is another important application of the invention.

The object of the invention is therefore to provide a method and apparatus for detecting moisture in the earth from an aircraft or a land vehicle.

Figure 1:
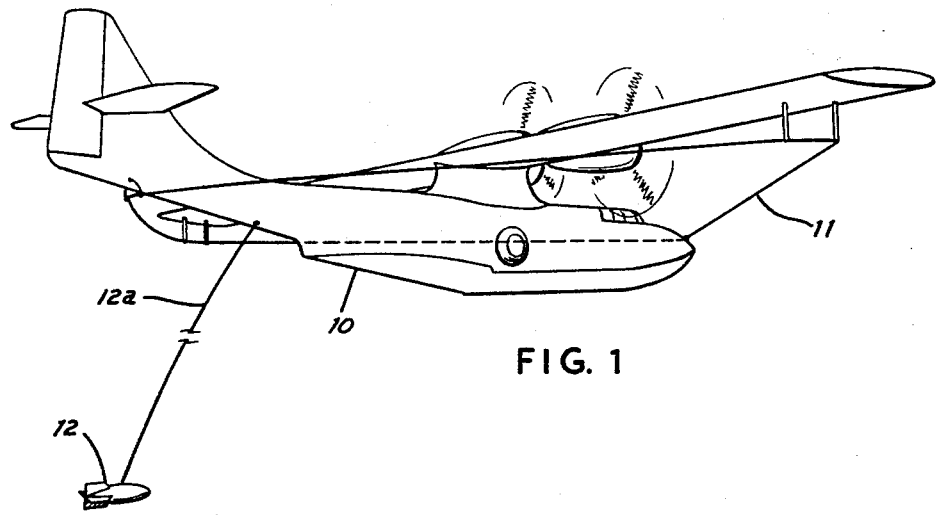
Figure 2:
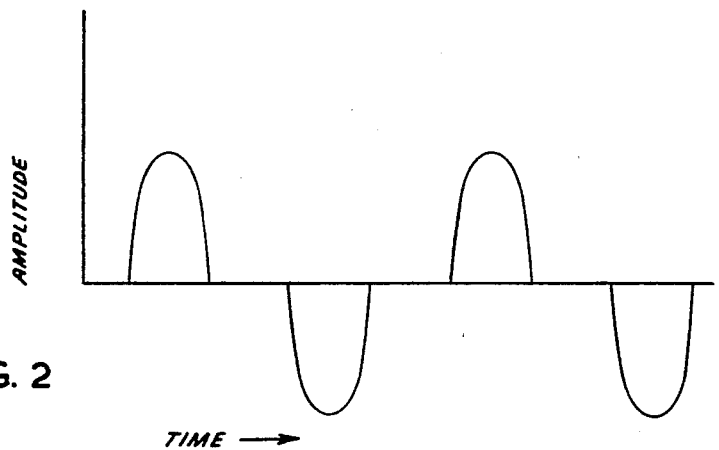
Figure 3:
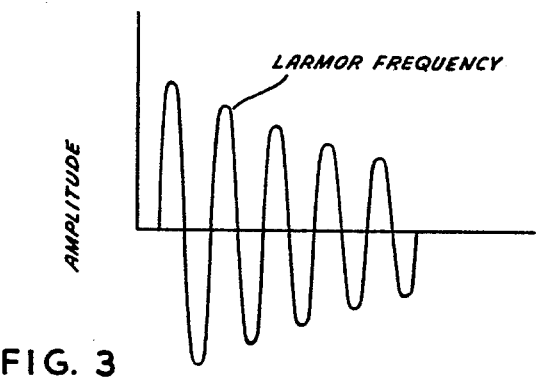
Figure 5:
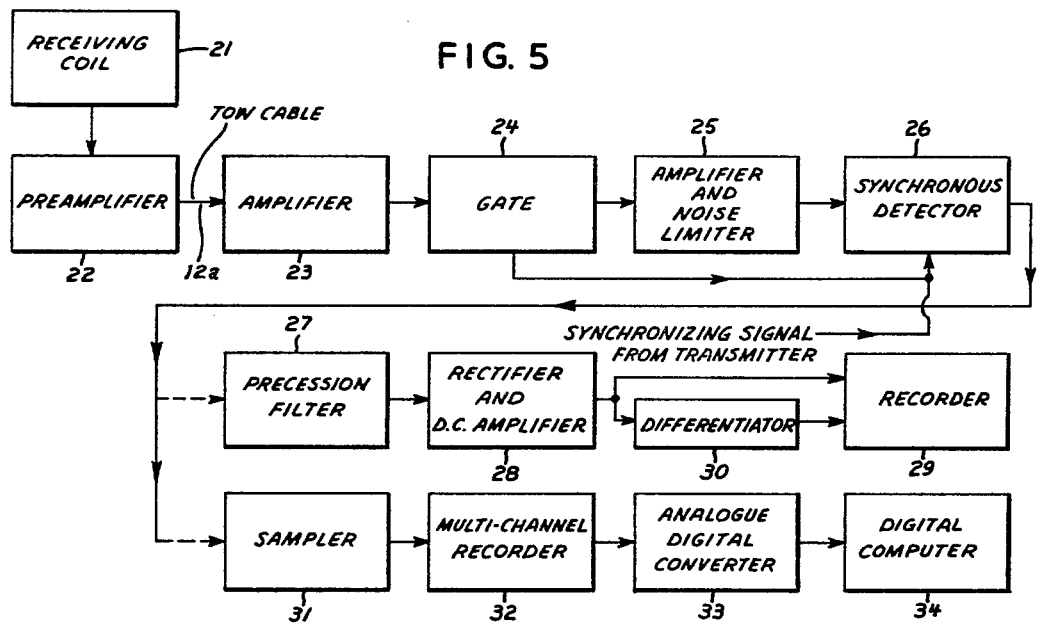
Figure 4:
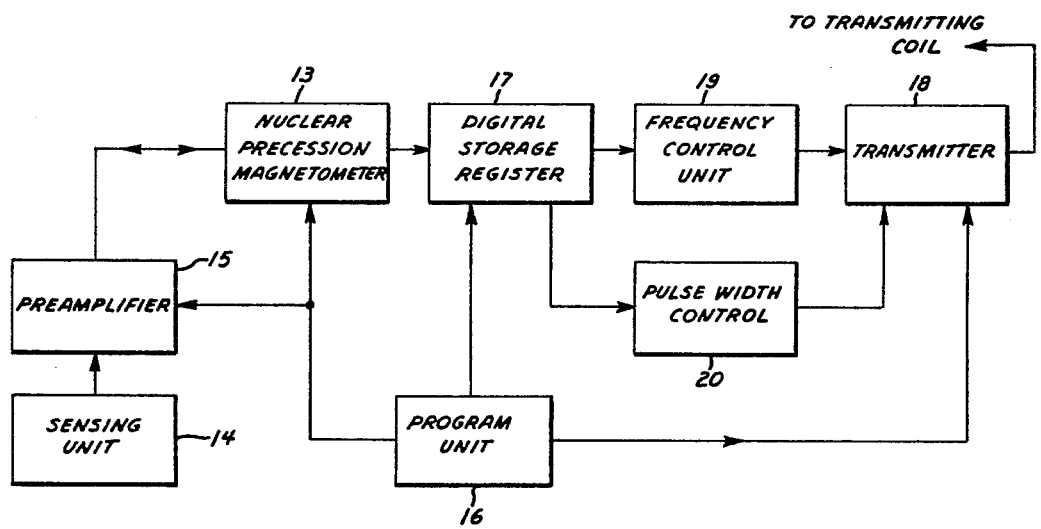

A preferred embodiment of the invention is illustrated in the acompanying drawings, wherein:

FIG. 1 shows a typical survey aircraft carrying a transmitting coil and towing a bird, FIG. 2 shows a repetition of bipolar pulses of the kind circulating in the transmitting coil, FIG. 3 shows a typical received precession signal, FIG. 4 is a block diagram of the transmitting portion of the apparatus, and FIG. 5 is a block diagram of the receiving portion of the apparatus.

Principles of operation

The principle of free precession of $H^1$ nuclei or protons has been applied to nuclear precession magnetometers for measuring the strength of the earth's magnetic field. In a conventional magnetometer of this kind the protons in a container of water are polarized by a magnetic field produced by current flowing in a coil which surrounds the water container. The polarizing field is abruptly shut off thereby permitting the protons to precess freely at their Lamor frequency about the earth's magnetic field. The precession or Larmor frequency depends upon the strength of the earth's magnetic field and the gyromagnetic ratio of the protons (a known constant) so that by measuring the precession frequency the strength of the earth's magnetic field can be determined. In a field of 50,000 gammas, for example, the precession frequency of protons is 2,130 c.p.s.

The protons contained in soil moisture are under the influence of the earth's magnetic field which varies in strength from place to place. If a magnetic field of a frequency equal to the Larmor frequency of the protons in a given volume of earth is applied at an angle to the earth's magnetic field, the protons will absorb energy from the applied field and will assume a higher energy level. When the applied field is removed, the protons will precess about the earth's magnetic field at their Larmor frequency. Thus it is necessary to know the strength of the earth's magnetic field in order to determine the required frequency of the applied field.

The precessing protons produce a precession field which decays exponentially. The peak amplitude of the precession field is proportional to the number of protons which have been excited by the applied field, and the time constant of the decaying precession field is inversely proportional to the freedom of the moisture. Thus, where the moisture is tightly bound in its containing environment, such as in clay, the decay is more rapid than the decay in a good aquifer. The decay time for moisture in clay is about 10 milliseconds, whereas the decay time for free water is about 2 seconds. It is therefore possible to estimate the type of material in which the moisture is contained by observing the decay rate or time constant of the precession field.

Serious problems are encountered when an airborne or even a mobile land system is contemplated. Instead of dealing with precession signals of the order of 1 millivolt as is typical in the case of the prior method mentioned above, the peak amplitude of the precession signals in a practical airborne system may be as low as 0.1 microvolt. In order to observe such precession signals it appears necessary to employ coherent detection. The switching between transmitting and receiving conditions must be fast in order to achieve reasonable signal to noise figures, yet it is difficult using presently available components to switch currents of the order of say 1,000 amperes (which appears to be required) at the usual Larmor frequencies.

In the present invention, current pulses which circulate in the transmitting coil are bipolar, and the repetition frequency of the pulses is exactly a sub-harmonic of the Larmor frequency. A preferred repetition frequency that is within the capabilities of presently available switching components is one-fifth of the Larmor frequency. Fourier analysis indicates that the resulting field at the Larmor frequency is about one-fifth that of the primary field (e.g. 500 c.p.s.). This one-fifth ratio represents a reasonable compromise between presently available switching components and maximum radiated power at the Larmor frequency. The strength of the earth's magnetic field is accurately measured at regular and frequent intervals, for example, once per second, and the repetition frequency of the transmitted pulses is automatically varied in accordance with changes in the earth's magnetic field.

Description of apparatus

Referring now to FIG. 1, an aircraft 10 carries a coil 11 which is supported at the front and rear of the aircraft, and near both wing tips. Precession signals from the earth are received by instruments in a bird 12 that is towed by the aircraft. A tow cable 12a provides both electrical and mechanical connection between the aircraft and the bird. The coil 11 may consist of a single turn, and it is so oriented that the resulting alternating magnetic field is applied at an angle (preferably 90°) to the earth's magnetic field. A typical effective diameter of the coil 11 is 866 cm.

The current circulating in the transmitting coil 11 is in the form of a repetition of bipolar half-sine pulses. The current amplitude is of the order of 1,000 amperes, and the pulse width is equal to the interval between successive pulses. The preferred repetition rate is one-fifth the Larmor frequency but lower harmonics could be used provided that sufficient energy is available at the Larmor frequency to achieve a reasonable signal to noise ratio. If, for example, a fundamental frequency of 250 c.p.s. results in saturation of the protons it would be desirable to use this lower frequency since it is easier to switch at the lower frequency. Actually transmitter power does not appear to be the limiting factor but rather receiver sensitivity.

The precession signals produced by precessing protons are in the form of a sinusoidal oscillation at the Larmor frequency with an exponentially decaying envelope, as shown in FIG. 2. The peak amplitude of the precession signals is proportional to the number of protons that have been excited and hence to the quantity of water in the volume of earth that is irradiated. The time constant of the precession signals depends upon the extent to which molecules of water are bound to their containing environment. The number of cycles of the precession signals that are received depends upon the interval between successive transmitted pulses. At a repetition rate of 500 c.p.s., for example, 2½ cycles of precession signals would be received, and similarly at a repetition rate of 250 c.p.s., 5 cycles of precession signals would be received before the next transmitted pulse.

Transmitter

Referring now to FIG. 4, the transmitting portion of the apparatus includes a conventional nuclear precession magnetometer 13 for measuring the strength of the earth's magnetic field. Associated with the magnetometer 13 is a sensing unit 14 which detects precession signals produced by precessing protons in the usual container of water, and a preamplifier 15 for amplifying the precession signals. A program unit 16 controls both the magnetometer 13 and the preamplifier 15, and one of its functions is to cause the magnetometer 13 to measure the earth's magnetic field at regular periodic intervals. One measurement per second is ordinarily sufficient, and a reading period of about 1/10 of a second is usual.

The earth's magnetic field strength information provided by the magnetometer 13 is fed into a digital storage register 17, the function of which is to store the information between measurements of the earth's magnetic field. Prior to each such measurement a control signal from the program unit 16 resets the digital storage register 17.

A pulse transmitter 18 of controllable frequency energizes the coil 11 with a repetition of abruptly terminated pulses. Half-sine bipolar pulses are preferred, although other waveforms exhibiting abrupt discontinuities such as sawtooth and square wave pulses could be used. The repetition frequency of the pulses is harmonically related to the Larmor frequency, and as indicated above the fifth sub-harmonic appears to be a good compromise between available switching components and maximum radiated power at the Larmor frequency. The width of the pulses is preferably equal to the interval between successive pulses for maximum peak power at the Larmor frequency. The transmitter repetition frequency is correlated with the earth's magnetic field by a frequency control unit 19. The earth's magnetic field strength information that is stored in the digital storage register 17 is fed to the frequency control unit 19 which in turn varies the repetition frequency in accordance with changes in the strength of the earth's magnetic field. As an added refinement the width of the pulses could also be correlated with the earth's magnetic field by a pulse width control 20. However, it appears that pulse width is far less critical to the overall sensitivity of the apparatus than is frequency so it might not be necessary to automatically vary the width of the pulses to compensate for changes in the earth's magnetic field. The transmitter 18 is turned off during the magnetometer reading period by a signal from the program unit 16.

Receiver

Referring now to FIG. 5, the receiving portion of the apparatus includes a receiving coil 21 and a preamplifier 22, both of which are housed in the bird 12. A typical receiving coil consists of 5,000 turns of wire wound on a 2.5 cm. diameter ferrite rod with a relative permeability of 2,400. The preamplifier 22 provides sufficient gain to raise the level of received precession signals above the level of noise generated in the tow cable 12a, and the preamplifier 22 has a low output impedance to match the impedance of the tow cable 12a. Precession signals carried to the aircraft 10 by the tow cable 12a are further amplified by an amplifier 23 in the aircraft. A gate 24 removes the transmitted pulse from the output of the amplifier 23 to permit additional amplification without requiring excessive dynamic range. An amplifier and noise limiter 25 provides additional gain and limits noise impulses which may be present in the output of the amplifier 23. A synchronous detector 26 coherently detects the precession signals and is locked to the transmitter repetition frequency by a synchronizing signal from the program unit 16 at the beginning of each transmitted pulse. The same synchronizing signal also controls the gate 24. The detector 26 reverses the polarity of negative precession signals and thus all received signals are of positive polarity. This tends to cancel noise signals and permits the detection of precession signals which may be buried in the noise. The rectified output of the synchronous detector 26 may be processed in several ways, two examples of which are shown in FIG. 5. The first is as follows.

The rectified output of the synchronous detector is fed to a sharp precession filter 27 tuned to the Larmor frequency. To achieve the optimum signal to noise ratio it is preferable to automatically tune the filter 27 after each measurement of the earth's magnetic field so that the center frequency of the filter 27 is always the same as the Larmor frequency. The output of the filter 27 is fed to a rectifier and D.C. amplifier 28. The resulting direct current output is proportional to the instantaneous amplitude of the rectified precession signals, and this information is recorded by a recorder 29. In addition, the output of the rectifier and D.C. amplifier 28 is differentiated by a differentiator 30, the output of which is proportional to the decay rate of the precession signals. This information is likewise recorded by the recorder 29. The transmitted pulses may also result in transient signals due to conduction effects in the earth, but such transients are blocked by the filter 27 since they are not impressed on a carrier of the Larmor frequency.

The second example of signal processing is as follows: The output of the synchronous detector 26 is fed to a sampler 31 the function of which is to synchronously sample the output of the synchronous detector 26 at a number of different points (e.g. 10) in each interval between successive transmitted pulses. The values of the samples are recorded on a multi-channel tape recorder 32 having one channel for each sample. The resulting tape recordings can be analyzed in the laboratory by means of an analogue to digital converter 33 and a digital computer 34 that is programmed to recover and display the required information such as the initial amplitude and decay rate of the precession signals. An advantage of this arrangement is that information relating to conduction effects in the earth can also be recovered.

The invention has been described with particular reference to an airborne survey, but it is to be understood that principles of the invention are also applicable to terrestrial surveys, e.g. using land vehicles. It might be desirable to combine airborne and terrestial surveys. For example, a rapid general survey of an area might be made by an aircraft. After analysis of the airborne observations, a land vehicle might be sent to areas which indicate particular promise. The land vehicle could make more detailed measurements, possibly with a view to plotting the configuration of an aquifer. Ordinarily the measurements would be made while the land vehicle is in motion, but it might be desirable to make some measurements with the vehicle stationary. For example, if a large quantity of relatively free water is located, it might be desirable to transmit bursts of transmitted pulses (e.g. for one second) and then listen for one second for precession signals. The reason for this is that the decay time for water alone is about 2 seconds so that in order to accurately measure the time constant for relatively free water it would be better to observe the precession signals for a longer time than is possible between successive transmitted pulses.

What we claim as our invention is:

1. A method of detecting moisture in the earth from a station at or above the surface of the earth, comprising:
    generating a repetition of abruptly terminated periodic high amplitude electric current pulses of alternating polarity, each pulse being unipolar and being of a predetermined width, each successive pulse being separated from the immediately preceding pulse by an interval approximately equal in duration to the pulse width,
    energizing a coil with the pulses,
    the coil being so oriented that the resulting alternating magnetic field is applied to a volume of earth below the station at an angle to the earth's magnetic field,
    periodically measuring the strength of the earth's magnetic field in the vicinity of the station to thereby estimate the Larmor frequency of protons in moisture contained in said volume of earth,
    varying the repetition rate of the pulses after each measurement of the earth's magnetic field to maintain the frequency of at least a portion of the alternating magnetic field at said Larmor frequency so that the protons are thereby excited into a higher energy level,
    receiving precession signals produced by precessing protons during intervals between successive pulses,
    amplifying and coherently detecting the received precession signals, and
    analyzing the detected precession signals to derive amplitude and time constant information therefrom and hence to estimate the quantity of moisture in said volume of earth and the nature of its environment.

2. A method of detecting moisture in the earth as claimed in claim 1 wherein the detected precession signals are analyzed by feeding them through a filter that is tuned to said Larmor frequency, rectifying and amplifying the filtered precession signals, differentiating the filtered precession signals after rectification and amplification, and recording both the differentiated and the undifferentiated filtered precession signals.

3. A method of detecting moisture in the earth as claimed in claim 1 wherein the detected precession signals are analyzed by sampling portions of the detected precession signals, recording each sampled portion, and computing the amplitude and time constant of the detected precession signals from the recordings of the sampled portions.

4. An apparatus for detecting moisture in the earth from a mobile station at or above the surface of the earth, comprising:
    a transmitter for generating a repetition of abruptly terminated periodic high amplitude electric current pulses of alternating polarity, each pulse being unipolar and being of a predetermined width, each successive pulse being separated from the immediately preceding pulse by an interval approximately equal in duration to the pulse width,
    the transmitter having a controllable pulse repetition frequency,
    a coil that is energized by the pulses,
    the coil being so oriented that the resulting alternating magnetic field is applied to a volume of earth below the station at an angle to the earth's magnetic field,
    a magnetometer for periodically measuring the strength of the earth's magnetic field in the vicinity of the station to thereby provide an estimate of the Larmor frequency of protons in moisture contained in said volume of earth,
    means for varying the transmitter repetition frequency in accordance with changes in the strength of the earth's magnetic field so that at least a portion of the alternating magnetic field is of the same frequency as said Larmor frequency whereby the protons are excited into a higher energy level,
    means for receiving precession signals radiated by precessing protons during intervals between successive pulses,
    an amplifier for amplifying the received precession signals,
    a synchronous detector for coherently detecting the amplified precession signals, and
    means for analyzing the detected precession signals to derive amplitude and time constant information therefrom and hence to estimate the quantity of moisture in said volume of earth and the nature of its environment.

5. An apparatus for detecting moisture in the earth as claimed in claim 4 wherein the magnetometer is a nuclear precession magnetometer and wherein means is provided for storing the information provided by the magnetometer between measurements of the earth's magnetic field.

6. An apparatus for detecting moisture in the earth as claimed in claim 4 wherein means is provided for varying the width of the pulses in accordance with changes in the repetition frequency of the transmitter so that the width of the pulses is kept approximately equal to the interval between successive pulses over a range of repetition frequencies.

7. An apparatus for detecting moisture in the earth as claimed in claim 4 wherein a gate is provided between the amplifier and the synchronous detector for gating out the transmitter pulses.

8. An apparatus for detecting moisture in the earth as claimed in claim 4 wherein the analyzing means includes a filter through which the detected precession signals are fed, the filter being tuned to the Larmor frequency, a rectifier and D.C. amplifier for respectively rectifying and amplifying the filtered precession signals, a differentiator for differentiating the filtered precession signals after rectification and amplification, and a recorder having one channel for recording the differentiated precession signals and another channel for recording the undifferentiated precession signals.

9. An apparatus for detecting moisture in the earth as claimed in claim 4 wherein the analyzing means includes a sampler for sampling portions of the detected precession signals, a recorder for recording each sampled portion, and means for computing the amplitude and time constant of the detected precession signals from the recordings of the sampled portions.

10. An apparatus for detecting moisture in the earth as claimed in claim 4 wherein the repetition frequency of the transmitter is one-fifth of said Larmor frequency.

11. An apparatus for detecting moisture in the earth as claimed in claim 4 wherein the repetition frequency of the transmitter is one-tenth of said Larmor frequency.

12. An apparatus for detecting moisture in the earth as claimed in claim 4 wherein the alternating magnetic field is applied at right angles to the earth's magnetic field.

References Cited
UNITED STATES PATENTS

| | | | |
|---|---|---|---|
| 2,968,762 | 1/1961 | Schuster | 324—0.5 |
| 3,019,383 | 1/1962 | Varian | 324—0.5 |
| 3,060,371 | 10/1962 | Townsend | 324—0.5 |
| 3,128,425 | 4/1964 | Codrington | 324—0.5 |

RUDOLPH V. ROLINEC, *Primary Examiner.*

M. J. LYNCH, *Assistant Examiner.*